Dec. 9, 1952      P. C. SYMMONS      2,620,818
AUTOMATIC TANK FILL VALVE
Filed Jan. 4, 1952
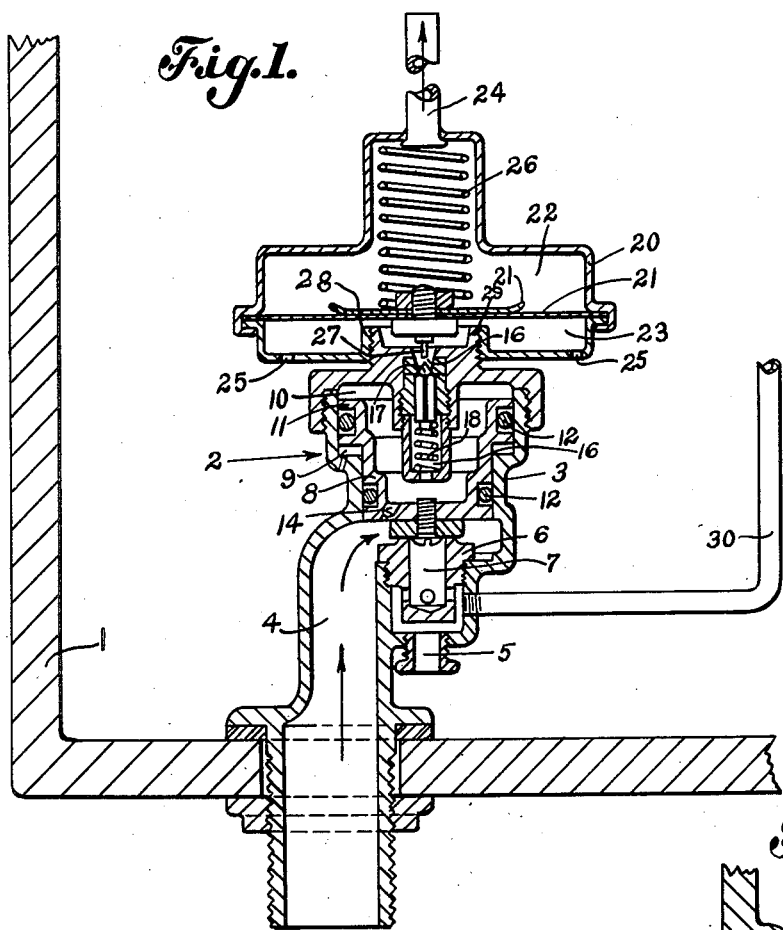
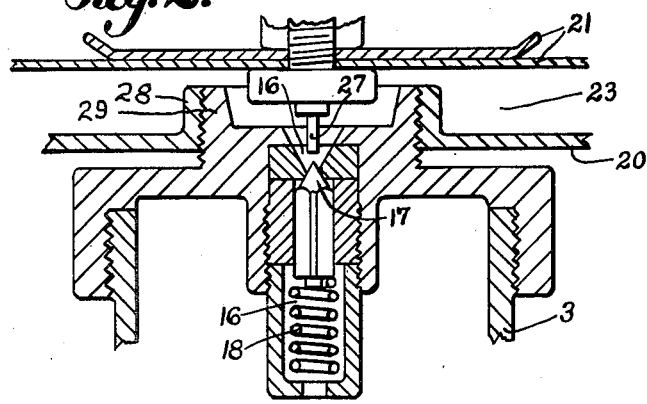
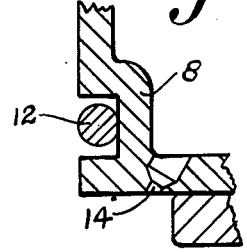
INVENTOR.
Paul C. Symmons.
BY Louis C. Smith
Attorney.

Patented Dec. 9, 1952

2,620,818

UNITED STATES PATENT OFFICE 2,620,818

AUTOMATIC TANK FILL VALVE

Paul C. Symmons, West Roxbury, Mass.

Application January 4, 1952, Serial No. 264,947

3 Claims. (Cl. 137—403)

This invention relates to an automatic valve for controlling the delivery of water to a flush tank, which valve will open automatically when the water level in the tank reaches a certain low point and will close automatically when the tank is filled.

The valve has been especially designed to take the place of the well known ball cock which is commonly used for controlling the supply of water to flush tanks.

An object of the invention is to provide an improved automatic valve for this purpose which is effective in operation and which will provide long service without requiring any attention.

In the drawings,

Fig. 1 is sectional view showing a valve embodying my invention installed in a flush tank, a part of said tank being shown in section.

Fig. 2 is an enlarged fragmentary sectional view showing the valve controlling the vent passage and means for operating it.

Fig. 3 is a fragmentary sectional view on a large scale illustrating the portion of the piston valve having the restricted orifice.

In the drawings, 1 indicates a portion of a flush tank, and 2 indicates generally a valve embodying my invention which controls the delivery of water into the tank. This valve is installed in the tank near the bottom thereof, and it comprises a valve casing 3 which is provided with an inlet passage 4 connected to a source of water supply and through which water is delivered to the valve.

The valve casing also has a discharge opening 5 through which the water is delivered directly into the tank.

Situated between the inlet passage 4 and the discharge opening 5 is a valve seat member 6 having a central port or duct 7 that provides a communication between the inlet passage 4 and the discharge opening 5.

Cooperating with the valve seat member is a piston valve 8 adapted to seat on the valve seat member, as shown in Fig. 1, thereby closing the valve. The piston valve 8 operates in a valve chamber 9 with which the valve casing 3 is provided, and said piston valve as well as the valve chamber 9 is smaller at its lower end than at its upper end, the valve chamber having an enlarged upper end portion 10, and the piston valve having an enlarged upper end portion 11 which fits the enlarged upper portion of the valve chamber.

12 indicates packing or sealing elements having for their purpose to provide a tight seal between the piston valve and the walls of the valve chamber.

The piston valve is provided with a restricted orifice 14 which forms a communication between the inlet passage 4 and the valve chamber 9 behind the piston valve. This restricted passage permits a flow of the water from the inlet passage into the upper end of the valve chamber so that normally the pressure in the upper end of the valve chamber will be the same as that in the inlet passage 4.

Since the area of the piston valve subjected to the pressure in the valve chamber is greater than the area of the piston valve which is subjected to the pressure in the inlet passage, said valve will normally be held to its seat by the water pressure in the valve chamber.

The valve casing is also provided with a normally closed vent passage which forms a communication between the valve chamber behind the piston valve and the interior of the tank 1. This vent passage is indicated at 16 and is larger than the restricted passage 14. Said vent passage is normally closed by a valve 17 which is held to its seat by means of a spring 18.

So long as the vent passage is closed by the valve 17, the pressure in the valve chamber behind the piston valve will be maintained at substantially that within the inlet passage 4.

The opening of the vent passage 16 by unseating the valve 17 will vent the valve chamber behind the piston valve, and as the vent passage 16 is larger than the restricted orifice 14, the water will flow out of the upper end of the valve chamber through the vent passage faster than it could flow into said chamber through said restricted orifice. As a result, the pressure in the valve chamber will be reduced to a point at which the pressure of the water in the inlet passage against the under side of the piston valve will overcome the pressure above said valve, at which time the valve will be opened to permit water to flow into the tank through the discharge opening 5.

The present invention involves means for unseating the valve 17 to open the vent passage when the water level in the tank 1 reaches a predetermined low point, thereby opening the piston valve as above described to allow the tank to be again filled, and the invention also includes means for closing the vent passage by the valve 17 when the water level in the tank rises to a predetermined point. As soon as the valve 17 is closed the water pressure in the valve chamber will be built up by water flow through the restricted orifice 14 until the pressure behind the piston is sufficient to seat the valve onto the valve seat member.

For thus controlling the valve 17 there is provided a diaphragm casing 20 which is divided by a flexible diaphragm 21 into an upper chamber 22 and a lower chamber 23. The upper chamber 22 is open to the atmosphere through a pipe 24 which extends from said chamber 22 to a point above the water level of the tank when it is full, and thus atmospheric pressure is maintained in the chamber 22.

The lower chamber 23 communicates with the interior of the tank through ports 25 formed in the bottom of the casing 20, and hence the pressure in the chamber 23 against the under side of the diaphragm 21 will vary as the head in the tank varies. When the tank is full the pressure in the chamber 23 will be greater than when the tank is nearly empty.

The diaphragm 21 is acted upon by a spring 26 which applies a downward pressure against the diaphragm in opposition to the pressure in the chamber 23. Said spring and the atmospheric pressure maintained in the upper chamber 22 through the medium of the pipe 24 provides a substantially constant down pressure against the diaphragm 21. This spring is so designed that when the tank is filled the pressure in the chamber 23 beneath the diaphragm is sufficient to overcome the substantially constant downward pressure thereon and thus hold it in the position shown in Fig. 1. When, however, the head in the tank reaches a predetermined low point the pressure in the chamber 23 is reduced to a point at which the pressure against the upper side of the diaphragm is effective to move it downwardly.

The diaphragm 21 carries on its under side a valve unseating pin or projection 27 which is directly above the venting valve 17, and is of such a length that when the diaphragm is in its normal position shown in Fig. 1 the pin 27 is spaced slightly from said valve.

When the tank has been flushed and the water level therein has fallen to a point wherein the pressure against the under side of the diaphragm 21 is overcome by the pressure of the spring 26, the diaphragm will move downwardly thereby bringing the pin 27 into engagement with the venting valve 17 and unseating the latter. As stated above, the unseating of the valve 17 vents the valve chamber above the piston valve, the water in said chamber flowing through the vent passage into the chamber 23 and thence into the tank through the ports 25.

When the valve chamber is thus vented the pressure therein will be reduced to a point at which the pressure against the under side of the piston valve is sufficient to open said valve, thereby allowing the water to flow from the inlet passage into the tank. The tank will thus begin to fill, and as it fills the head in the tank, and consequently the pressure in the chamber 23, will increase until the pressure against the under side of the diaphragm 21 is sufficient to raise said diaphragm and remove the pin 27 from engagement with the valve 17. The valve will then be automatically seated by the spring 18, thereby closing the vent passage, and when this occurs the pressure in the valve chamber behind the piston valve will be built up by the flow of water through the restricted orifice 14 until sufficient pressure has developed behind the piston valve to close the valve 8 onto the seat member 6 and thus cut off further flow of water into the tank.

Means are herein provided for varying the point in the descending level of the water in the tank as it is being emptied at which the venting valve 17 is opened to initiate the opening of the main valve 8. This is accomplished by mounting the diaphragm casing 20 on the valve casing 3 so that it can be adjusted vertically relative to said valve casing thereby to vary the gap between venting valve 17 and the valve unseating pin 27. The diaphragm casing is shown as having an upturned annular flange 28 which is screw threaded on to the hub portion 29 of said valve casing so that by turning the diaphragm casing on said hub portion, said casing will be raised or lowered thereby to increase or decrease the space or gap between the pin 27 and the venting valve 17. The length of such gap determines the level to which the water in the tank must be lowered before the venting valve 17 is opened.

30 indicates the usual refill pipe connected to the discharge end of the valve device.

I claim:

1. Means for controlling the liquid level in a tank comprising a valve casing having an inlet passage and a discharge opening, a valve seat member providing a communication between said inlet passage and discharge opening, said valve casing having a valve chamber smaller at one end than at the other with the smaller end opening into the inlet passage, a piston valve operating in said valve chamber and having a smaller end subjected to the pressure in the inlet passage and a larger rear end, said piston valve having a continuously open restricted orifice therethrough forming a direct restricted communication between the inlet passage and the larger end of the valve chamber, means providing a vent passage between the larger end of the valve chamber and the interior of the tank, which vent passage is larger than the restricted orifice, a spring pressed venting valve normally closing the vent passage, whereby the piston valve will be normally held seated on the valve seat member by the liquid which flows through the restricted orifice into the rear end of the valve chamber, a diaphragm casing mounted on the valve casing, a diaphragm dividing said diaphragm casing into an upper and a lower chamber, the latter of which communicates with the interior of the tank, means providing a substantially constant pressure against the upper side of the diaphragm, a valve pin depending from the diaphragm and held slightly spaced from the venting valve by the pressure in the lower chamber when the liquid level in the tank is normal, said substantially constant pressure against the upper side of the diaphragm moving the latter downwardly to unseat the venting valve when the pressure in the lower chamber has been reduced to a predetermined point due to the lowering of the head in the tank, thus venting the valve chamber and reducing the pressure therein to a point at which the piston valve will be automatically opened by the pressure in the inlet passage.

2. Means for controlling the liquid level in a tank comprising a valve casing having an inlet passage and a discharge opening, a valve seat member providing a communication between said inlet passage and discharge opening, said valve casing having a valve chamber smaller at one end than at the other with the smaller end opening into the inlet passage, a piston valve operating in said valve chamber and having a smaller end subjected to the pressure in the inlet passage and a larger rear end, said piston valve having a continuously open restricted orifice therethrough forming a direct restricted communication between the inlet passage and the larger end of the valve chamber, means providing a vent passage between the larger end of the vent chamber and the interior of the tank, which vent passage is larger than the restricted orifice, a spring pressed venting valve normally closing the vent passage, whereby the piston valve will be normally held seated on the valve seat member by the liquid which flows through the restricted orifice into the rear end of the valve chamber, a diaphragm casing mounted on the valve casing, a diaphragm dividing said diaphragm casing into an upper and a lower chamber, the latter of which communicates with the interior of the tank whereby the under side of the diaphragm is subjected to varying pressure depending on the head in the tank, a valve unseating pin depending from the diaphragm and normally slightly spaced from the venting valve, and a spring to move the diaphragm downwardly when the pressure on the under side thereof has been reduced to a predetermined point due to a lowering of the head in the tank, thereby to bring said pin into engagement with the venting valve and unseat the latter, thus venting the valve chamber and reducing the pressure therein to a point at which the piston valve will be automatically opened by the pressure in the inlet passage.

3. Means for controlling the liquid level in a tank as defined in claim 2, in which the diaphragm casing is mounted on the valve casing for adjustment in a vertical direction whereby the gap between the valve unseating pin and the venting valve may be varied thereby to vary the point in the descending liquid level in the tank as liquid is being withdrawn therefrom, at which the venting valve will be opened.

PAUL C. SYMMONS.

REFERENCES CITED

The following references are of record in the file of this patent:

UNITED STATES PATENTS

| Number | Name | Date |
|---|---|---|
| 226,224 | Demarest | Apr. 6, 1880 |
| 1,504,201 | Anderson | Aug. 12, 1924 |
| 1,915,716 | Bradshaw | June 27, 1933 |
| 2,265,114 | Hartley | Dec. 2, 1941 |
| 2,418,614 | Annin | Apr. 8, 1947 |
| 2,471,328 | Jones | May 24, 1949 |